United States Patent [19]
Burton

[11] Patent Number: 5,885,319
[45] Date of Patent: Mar. 23, 1999

[54] SYSTEM AND METHOD FOR PROCESSING EFFLUVIA GAS TO PRODUCE ENRICHED FERTILIZER

[76] Inventor: R. Edward Burton, 222 Franklin Ave., Willits, Calif. 95490

[21] Appl. No.: 905,846

[22] Filed: Aug. 4, 1997

[51] Int. Cl.⁶ .............................. C05F 11/08; C05C 7/00; C01B 17/00; B01J 8/18
[52] U.S. Cl. .......................... 71/9; 71/11; 71/15; 71/58; 71/60; 423/235; 423/242.1; 422/139
[58] Field of Search .................... 71/58, 60, 11, 71/15, 9; 423/242.1, 235; 422/139

[56] References Cited

U.S. PATENT DOCUMENTS

| | | | |
|---|---|---|---|
| 888,145 | 5/1908 | Collett | 71/60 |
| 3,632,305 | 1/1972 | Hardison | 23/2 |
| 4,247,321 | 1/1981 | Persinger | 71/59 |
| 4,539,184 | 9/1985 | Stehning | 422/170 |
| 4,576,803 | 3/1986 | Hegemann et al. | 423/242 |
| 4,882,058 | 11/1989 | Burton | 210/601 |
| 5,240,611 | 8/1993 | Burton | 210/603 |
| 5,480,463 | 1/1996 | Hackl | 55/222 |
| 5,609,733 | 3/1997 | Burton | 203/10 |

FOREIGN PATENT DOCUMENTS 351114398 10/1976 Japan.

Primary Examiner—Wayne Langel
Assistant Examiner—Melanie Wong
Attorney, Agent, or Firm—Flehr Hohbach Test Albritton and Herbert

[57] ABSTRACT

System and method for processing an effluvia gas containing $NO_x$ and sulfur dioxide to produce an enriched fertilizer. The gas is brought into contact with a host liquid and calcium oxide to convert the $NO_x$ to calcium nitrate and the sulfur dioxide to calcium sulfate, and the liquid containing the calcium nitrate and the sulfur dioxide is then passed through a bed of horse manure media so that the calcium nitrate and the sulfur dioxide accumulate in and thereby enrich the media for use as fertilizer.

26 Claims, 2 Drawing Sheets

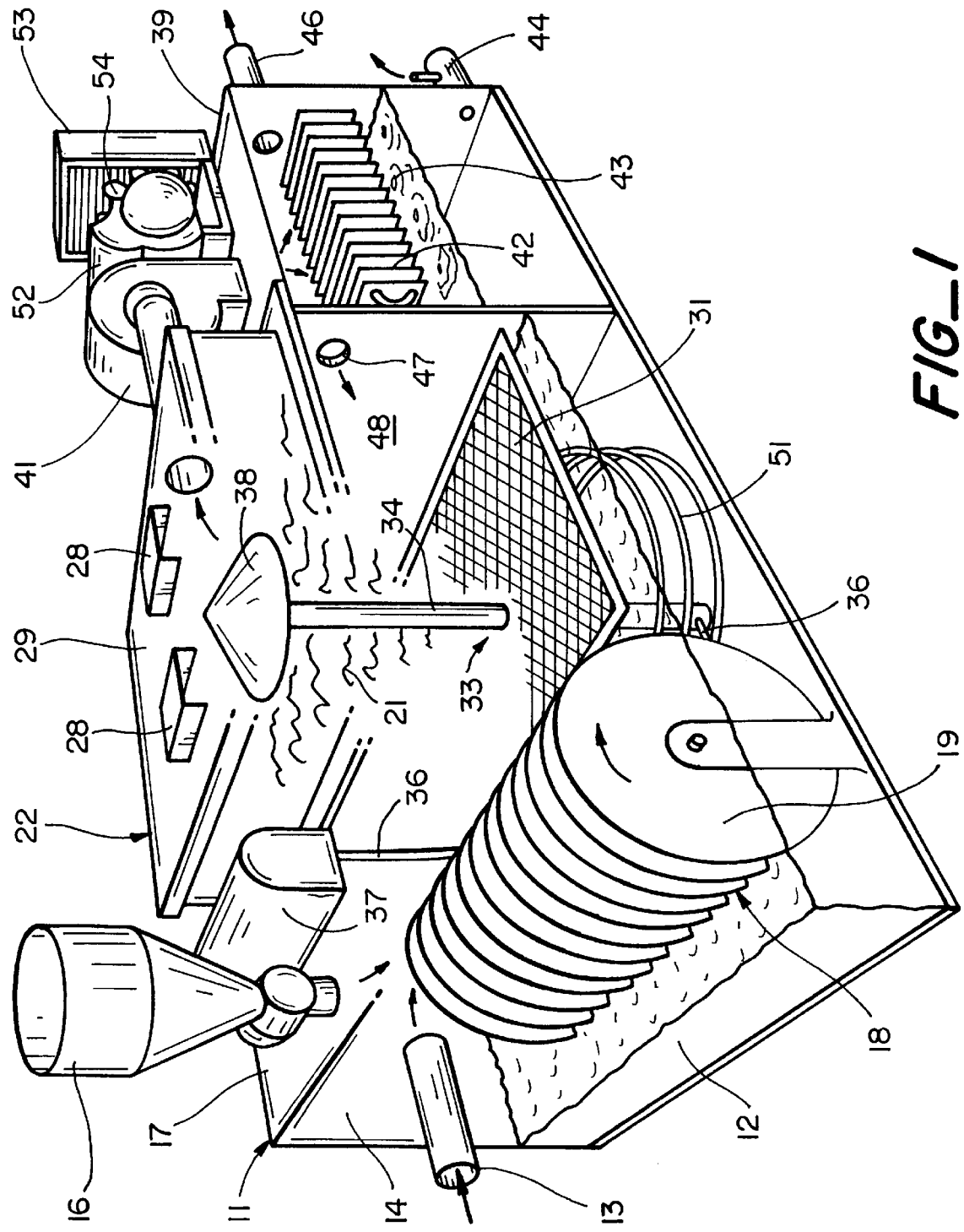
FIG_1

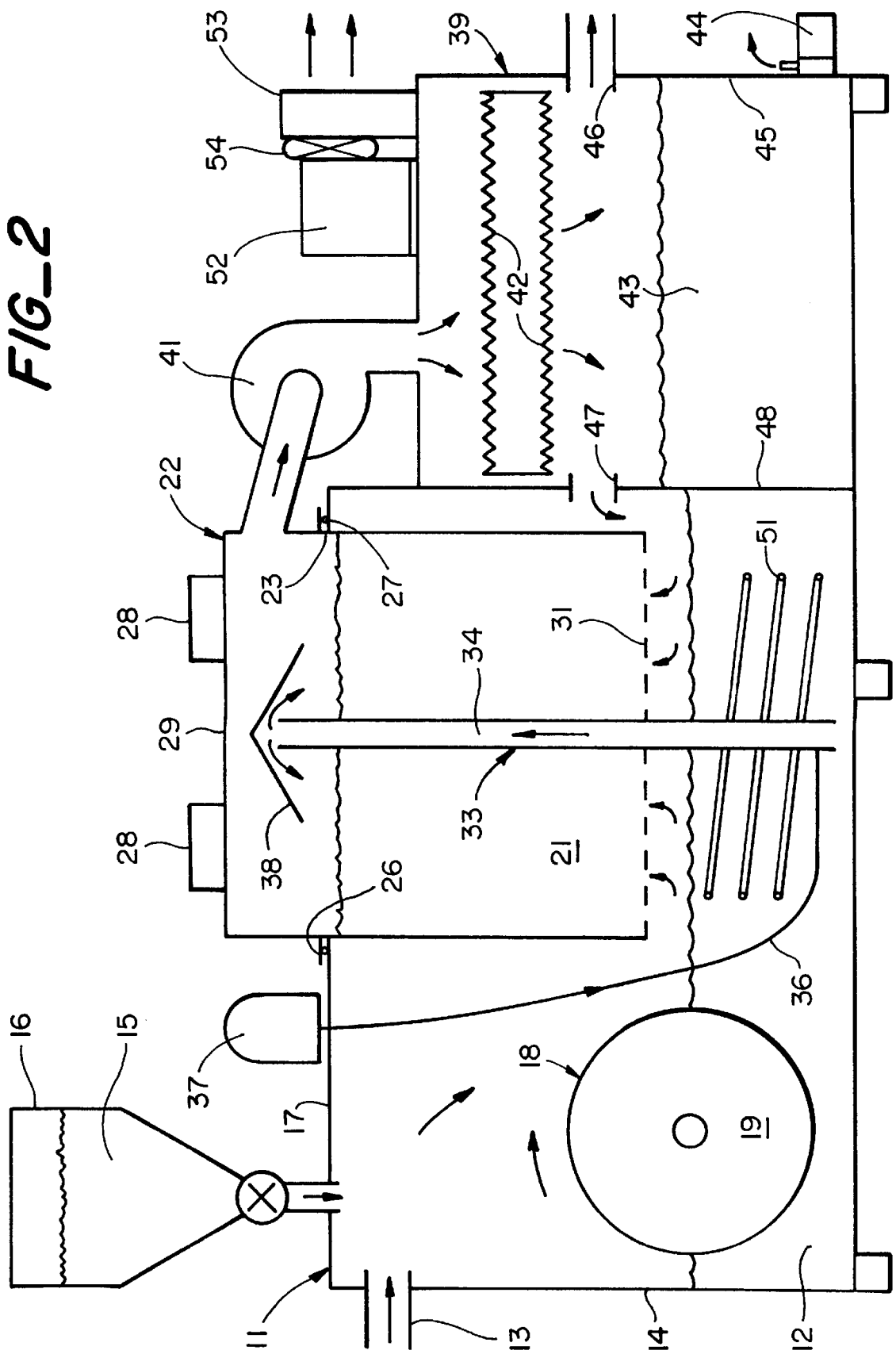
FIG_2

SYSTEM AND METHOD FOR PROCESSING EFFLUVIA GAS TO PRODUCE ENRICHED FERTILIZER

This invention pertains generally to the treatment of effluvia gases and, more particularly, to a system and method for processing an effluvia gas to produce an enriched fertilizer.

Exhaust gases, or effluvia, from various combustion and/or melting processes contain oxides of nitrogen ($NO_x$) and sulfur dioxide ($SO_2$). Heretofore, Dynamic Technologies Corp., Vancouver, British Columbia, has developed a process for converting biomass waste materials such as municipal solid waste, sawdust, sewage sludge and animal waste into a product called Biolime for use in controlling sulfur dioxide ($SO_2$) and nitrogen oxide ($NO_x$) emissions from coal-fired boilers in Canada.

The product is obtained by reacting calcium oxide (CaO), or lime, and water with the pyrolysis oil from the biomass waste to form hollow spherical particles with lime on their exterior surfaces. The lime reacts with the $SO_2$ and the $NO_x$ to form calcium sulfate ($CaSO_4$), or anhydrous gypsum, and calcium nitrate ($Ca(NO_3)_2$). The gypsum can be used in the manufacture of wallboard, but no one to date has found a use for the calcium nitrate.

It is in general an object of the invention to provide a new and improved system and method for processing an effluvia gas to produce a useful product.

Another object of the invention is to provide a system and method of the above character which produces a fertilizer which is enriched with nitrates and gypsum.

Another object of the invention is to provide a system and method of the above character in which substantially all of the weed seeds in the fertilizer are killed.

These and other objects are achieved in accordance with the invention by providing a system and method in which an effluvia gas containing $NO_x$ and sulfur dioxide is brought into contact with a host liquid and calcium oxide to convert the $NO_x$ to calcium nitrate and the sulfur dioxide to calcium sulfate, and the liquid containing the calcium nitrate and the sulfur dioxide is then passed through a bed of horse manure media so that the calcium nitrate and the sulfur dioxide accumulate in and thereby enrich the media for use as fertilizer.

FIG. 1 is an isometric view, partly broken away, of one embodiment of a system for processing an effluvia gas in accordance with the invention.

FIG. 2 is a cross-sectional view, somewhat schematic, of the embodiment of FIG. 1.

As illustrated in the drawings, the system includes a sump tank 11 which has water or another suitable host liquid 12 in the lower portion thereof. Exhaust gases, or effluvia, from various combustion and/or melting processes are introduced into the sump through an inlet 13 in the end wall 14 of the tank. Such gases contain oxides of nitrogen ($NO_x$), sulfur dioxide ($SO_2$), unburned carbon (smoke) and water.

Calcium oxide (CaO) 15 is introduced into the sump tank through a dry feeder 16 mounted on the top wall 17 of the tank and added to the water in the sump. A gas scrubber 18 having a plurality of rotating disks 19 is mounted in the lower portion of the sump, with the disks rotating in the liquid at a speed on the order of 30 to 100 rpm. The calcium oxide converts the $NO_x$ to calcium nitrate and the sulfur dioxide to calcium sulfate (gypsum), and the rotating disks keep the calcium nitrate and calcium sulfate in suspension in the liquid. Unburned carbon and gases are trapped in the liquid, and the water of combustion is almost all condensed.

Toward one end of the sump, a bed 21 of compost material is located above the liquid. The compost material is disposed in a box 22 which is removably mounted to the tank. The box extends through an opening 23 in the top wall 17 of the tank and is suspended in the tank by a laterally projecting flange 26 which bears against the top wall, with an O-ring seal 27 between the flange and the wall. Lifting brackets 28 are affixed to the top wall 29 of the box for engagement by a fork lift to facilitate installation and removal of the box. Top wall 29 is removable to permit the compost material, or media, to be loaded into and removed from the box. The bottom wall of the box consists of a screen 31 through which liquids can pass.

A foam lift system 33 pumps liquid from the sump to the upper portion of the media box. This system includes a lift tube 34 which extends vertically between the lower portion of the sump and the upper portion of the box, an air supply line 36 which opens into the lower portion of the lift tube, and a compressor 37 which is mounted on the top wall of the tank and connected to the inlet end of the air supply line. The compressor introduces air bubbles into the lift tube through the air line below the surface of the liquid. The bubbles produce a foamy mixture of liquid and air which is lighter than the surrounding liquid and is forced up the tube by the foam generated below it.

A conical baffle or deflector 38 is mounted in the upper portion of the media box above the lift tube for spreading the foam over the upper surface of the media bed. The foam flowing out of the upper end of the tube impinges upon the under side of the deflector, falls onto the upper surface of the media bed, and then filters down through the media and back to the sump.

A preferred compost material or media for use in this system is horse manure. It filters the calcium nitrate, calcium sulfate and other minerals out of the liquid from the scrubber, and is enriched by them. The horse manure also contains cellulose fiber, e.g. undigested hay, which attracts and holds colloidal particulates and aerosols, many of which also add valuable nutrients to the media. Bacteria and fungi (biota) in the horse manure degrade organic solids and convert them to carbon dioxide, water and energy in the form of heat. They also absorb and further convert oxides of nitrogen in the liquid to useful nitrates. Tests have shown that over 90 percent of the weed seeds in the media are killed by carbon monoxide and/or other elements in liquid without the need for methyl bromide or other toxic gases which have been employed in other processes for killing weed seeds.

Warm moist air from the media bed is condensed and collected as distilled water in a distillate tank 39. The air leaves media bed at a temperature on the order of 120° F. dry bulb (115° F. wet bulb), and is collected by a blower 41 which directs it into the distillate tank through cooling coils 42. Those coils are maintained at a temperature on the order of 40° F., and the condensed vapor 43 collects in the lower portion of the tank. The condensate is suitable for use as industrial grade distilled water. This water has total dissolved solids of less than 25 ppm, and is suitable for use in a number of cleaning, rinsing, mixing and other applications. An electrically operated pump 44 is mounted on the end wall 45 of the tank for pumping the distilled water out of the tank.

Effluvia from the distillate tank exits the system through an exhaust port 46 in end wall 45, and passes to the atmosphere or to another system for further treatment. The amount of effluvia leaving the system is approximately equal to the amount entering through inlet 13.

A port 47 in the wall 48 between the sump tank and the distillate tank permits air to pass from the distillate tank to the sump tank and recirculate up through the media to help maintain the biota and to provide further evaporation and cooling.

A heating coil 51 is mounted in the sump tank beneath the media bed for maintaining the liquid in the sump at a temperature on the order of 100° F. in order to promote the microbiological activity in the media. A Carnot cycle compressor 52 circulates a refrigerant gas through the heating coil at a temperature on the order of 160° F. and through the cooling coils 42 at a temperature on the order of 40° F., with the heating coil serving as an expander and the cooling coils serving as a condenser in the Carnot system.

A heat dumping radiator 53 with a cooling fan 54 is mounted on top of distillate tank, and means (not shown) is provided for diverting the refrigerant from the heating coil to the radiator when the temperature in the sump rises above 110° F.

Operation and use of the system, and therein the method of the invention, are as follows. A bed of fresh horse manure is placed in media box 22, and the box is mounted in sump tank 11. Effluvia gas is introduced into the sump through inlet 13 and contacted with the water or other host liquid in the lower portion of the sump. Calcium oxide is added to the water from feeder 16, and $NO_X$ and sulfur dioxide from the gas are converted to calcium nitrate and calcium sulfate. They are kept in suspension in the water by the rotating disks of scrubber 18. Unburned carbon and gases are trapped in the water, and the water of combustion is condensed.

Liquid from the sump is foam lifted to the top of the media box and spread over the upper surface of the media. It then trickles down through the media, with the calcium nitrate and calcium sulfate being filtered out and accumulating to enrich the media. Any liquid which passes all the way through the media drips back into the sump for further processing.

The cellulose fiber in the media attracts and holds colloidal particulates and aerosols, many of which also add valuable nutrients to the media. Bacteria and fungi (biota) in the horse manure degrade organic solids and convert them to carbon dioxide, water and energy in the form of heat. They also absorb and convert oxides of nitrogen in the liquid to useful nitrates. Weed seeds are killed by carbon monoxide and/or other elements in the liquid.

After about 300 hours of operation, the media box is removed, and the enriched media is dried and packaged for use as fertilizer. That fertilizer is enriched with nitrates and gypsum (calcium sulfate) and is substantially free of weed seeds.

The effluvia gas enters the system at a temperature on the order of 800° F. to 900° F., which is generally sufficient to maintain the water in the sump at a temperature (e.g. 100° F.) sufficient to promote the microbiological activity in the media. When the gas is not flowing or the temperature is not otherwise sufficient, the temperature in the media is maintained by the flow of heated refrigerant through coil 51 in the Carnot system. When the temperature of the water rises above about 110° F., the refrigerant is diverted from the coil to radiator 53. When the temperature of the water drops below 100° F., the refrigerant is returned to the coil.

Warm moist air from the media bed is directed through cooling coils 42 where moisture in the air is condensed and collected in distillate tank 39. The distilled water is withdrawn as needed by pump 44. Some of the effluvia in the distillate tank is returned to the sump tank through port 47, and some is discharged to the atmosphere though exhaust port 46.

The invention has a number of important features and advantages. It converts the horse manure media to a fertilizer which is enriched with nitrates and gypsum and is substantially free of weed seeds. It kills the weed seeds without the need for methyl bromide or other toxic gases employed in other weed seed killing processes. It also eliminates $NO_X$ and other gases from the effluvia gas and produces industrial grade distilled water which can be used for a number of applications.

It is apparent from the foregoing that a new and improved system and method for processing an effluvia gas to produce an enriched fertilizer have been provided. While only certain presently preferred embodiments have been described in detail, as will be apparent to those familiar with the art, certain changes and modifications can be made without departing from the scope of the invention as defined by the following claims.

I claim:

1. In a system for producing an enriched fertilizer from an effluvia gas containing $NO_X$ and sulfur dioxide: a gas scrubber for contacting the effluvia gas with a host liquid and calcium oxide to convert the $NO_X$ to calcium nitrate and the sulfur dioxide to calcium sulfate, a bed of compost material, and means for passing the liquid from the scrubber through the compost material so that the calcium nitrate and the sulfur dioxide accumulate in and thereby enrich the compost material for use as fertilizer.

2. The system of claim 1 wherein the gas scrubber includes a plurality of disks which rotate in the liquid.

3. The system of claim 1 including means for returning liquid which passes through the compost material back to the scrubber.

4. The system of claim 1 wherein the host liquid is water.

5. The system of claim 1 including means for cooling warm moist air from around the compost material to condense moisture contained in the air and thereby produce distilled water.

6. The system of claim 1 wherein the means for passing the liquid through the compost material includes a foam lift for raising the liquid above the media bed and means for distributing the liquid over the upper surface of the compost material so that the liquid can filter down through the compost material.

7. The system of claim 1 wherein the compost material comprises a horse manure media.

8. The system of claim 1 including a sump for holding the host liquid, and means for introducing the effluvia gas and the calcium oxide into the sump, the gas scrubber being disposed in the sump and having a plurality of disks for rotation in the liquid to keep the calcium nitrate and calcium sulfate in suspension in the liquid.

9. The system of claim 8 further including means for passing warm moist air from around the compost material through a cooler to condense moisture contained in the air, and a distillate tank for collecting the condensed moisture.

10. The system of claim 8 including a container positioned above the liquid in the sump for holding the compost material, the container having an open bottom portion through which liquid passing through the compost material can drip back into the sump.

11. In a method of producing an enriched fertilizer from an effluvia gas containing $NO_X$ and sulfur dioxide, the steps of: contacting the effluvia gas with a host liquid and calcium oxide to convert the $NO_X$ to calcium nitrate and the sulfur dioxide to calcium sulfate, and passing the liquid containing the calcium nitrate and the sulfur dioxide through a bed of compost material so that the calcium nitrate and the sulfur dioxide accumulate in and thereby enrich the compost material for use as fertilizer.

12. The method of claim 11 wherein the effluvia gas is contacted with the liquid and the calcium oxide in a spinning disk scrubber.

13. The method of claim 12 including the step of returning liquid which passes through the compost material back to the scrubber.

14. The method of claim 11 including the step of cooling warm moist air from around the compost material to condense moisture contained in the air and thereby produce distilled water.

15. The method of claim 11 wherein the liquid is passed through the compost material by raising the liquid above the compost material bed with a foam lift, distributing the liquid over the upper surface of the compost material bed, and allowing the liquid to filter down through the compost material.

16. The method of claim 11 wherein the bed of compost material through which the liquid containing the calcium nitrate and the sulfur dioxide is passed comprises a horse manure media.

17. The method of claim 11 wherein the effluvia gas and the calcium oxide are introduced into the host liquid in a sump, and the liquid is agitated with a gas scrubber having a plurality of rotating disks to keep the calcium nitrate and calcium sulfate in suspension in the liquid.

18. The method of claim 17 further including the steps of passing warm moist air from around the compost material through a cooler to condense moisture contained in the air, and collecting the condensed moisture in a distillate tank.

19. The method of claim 17 including the step of returning liquid passing through the compost material back to the liquid in the sump.

20. In a system for processing an effluvia gas which contains $NO_X$ and sulfur dioxide, a sump for holding a host liquid, means for introducing the effluvia gas into the sump, means for introducing calcium oxide into the sump to convert $NO_X$ and sulfur dioxide in the gas to calcium nitrate and calcium sulfate, a gas scrubber disposed in the sump having a plurality of disks for rotation in the liquid to keep the calcium nitrate and calcium sulfate in suspension in the liquid, a bed of compost material, means for passing liquid from the sump through the compost material to enrich the material with the calcium nitrate and calcium sulfate, means for passing warm moist air from around the compost material through a cooler to condense moisture contained in the air, and a distillate tank for collecting the condensed moisture.

21. The system of claim 20 wherein the means for passing the liquid through the compost material comprises a foam lift for pumping the liquid from the sump to a level above the compost material, and means for distributing the liquid from the foam lift over the surface of the compost material.

22. The system of claim 20 wherein the compost material is held in a container above the liquid in the sump, the container having an open bottom portion through which liquid passing through the material can drip back into the liquid in the sump.

23. In a method of processing an effluvia gas which contains $NO_X$ and sulfur dioxide, the steps of: introducing the effluvia gas into a host liquid in a sump, introducing calcium oxide into the sump to convert $NO_X$ and sulfur dioxide in the gas to calcium nitrate and calcium sulfate, agitating the liquid with a gas scrubber having a plurality of rotating disks to keep the calcium nitrate and calcium sulfate in suspension, passing liquid from the sump through a bed of compost material to enrich the material with the calcium nitrate and calcium sulfate, passing warm moist air from around the compost material through a cooler to condense moisture contained in the air, and collecting the condensed moisture in a distillate tank.

24. The method of claim 23 wherein the liquid is passed through the compost material by foam lifting the liquid from the sump to a level above the compost material, and distributing the liquid over the surface of the compost material.

25. The method of claim 23 including the step of returning liquid passing through the compost material back to the liquid in the sump.

26. In a method of processing an effluvia gas which contains $NO_X$ and sulfur dioxide, the steps of: adding calcium oxide to the gas in a host liquid to convert the $NO_X$ and sulfur dioxide to calcium nitrate and calcium sulfate, and passing the liquid through a compost material to filter out the calcium nitrate and calcium sulfate. concerned with the enrichment of horse manure or the production of fertilizer, although it does show the use of a horse manure bed for filtering colloidal solids out of the water and digesting organic solids in it.

* * * * *